United States Patent [19]

Kotlar et al.

[11] Patent Number: 5,561,196
[45] Date of Patent: Oct. 1, 1996

[54] POLYPROPYLENE MATERIALS GRAFTED WITH AN EPOXYALKYL ACRYLATE COMPOUND

[75] Inventors: Hans K. Kotlar, Skien; Per M. Hansen, Stathelle, both of Norway

[73] Assignee: Den norske stats oljeselskap a.s., Stavanger, Norway

[21] Appl. No.: 454,104

[22] PCT Filed: Dec. 8, 1993

[86] PCT No.: PCT/NO93/00186

§ 371 Date: Jul. 13, 1995

§ 102(e) Date: Jul. 13, 1995

[87] PCT Pub. No.: WO94/13719

PCT Pub. Date: Jun. 23, 1994

[30] Foreign Application Priority Data

Dec. 10, 1992 [NO] Norway ................................. 924786

[51] Int. Cl.$^6$ ................................. C08F 255/02
[52] U.S. Cl. ................. 525/286; 525/313; 525/322; 525/324
[58] Field of Search .................. 525/286, 322, 525/313, 324, 263

[56] References Cited

U.S. PATENT DOCUMENTS

| | | | |
|---|---|---|---|
| 3,868,433 | 2/1975 | Bartz | 525/286 |
| 4,001,172 | 1/1977 | Steinkamp | 525/285 |
| 4,443,584 | 4/1984 | Michel | 525/286 |
| 5,036,141 | 7/1991 | Toyoshima | 525/286 |
| 5,066,726 | 11/1991 | Modic | 525/263 |

FOREIGN PATENT DOCUMENTS 0274744  7/1988  European Pat. Off. .

*Primary Examiner*—Vasu S. Jagannathan
*Attorney, Agent, or Firm*—Kirkpatrick & Lockhart LLP

[57] ABSTRACT

This invention relates to grafted polypropylene compositions and a process for their production. More particularly, the invention relates to polypropylene compositions based on polypropylene homopolymers, and copolymers of propylene with ethylene and/or butadiene, grafted with certain epoxy-alkyl acrylate compounds, and a process for their production. The grafted polypropylene compositions are useful especially as compatibilizers for addition to other polymer compositions.

31 Claims, 5 Drawing Sheets

POLYPROPYLENE MATERIALS GRAFTED WITH AN EPOXYALKYL ACRYLATE COMPOUND

BACKGROUND ART

Grafted polyolefin compositions, including polypropylene homopolymers and copolymers grafted with glycidyl acrylate and glycidyl methacrylate, are previously known in various applications, but such compositions have not been obtained by melt processing of the polyolefin composition.

SE 393,385 teaches the production of modified (grafted) polyolefins in a particulate form, having improved adhesion properties, especially an improved adhesion to materials having polar groups such as glass. A particulate α-olefin polymer having 2 to 10 carbon atoms is mixed with an organic peroxide as a radical-generating compound and a polymerizable compound selected from the group of glycidyl acrylate and glycidyl methacrylate, and the mixture is reacted in an inert atmosphere at a temperature below the tackyfying temperature of the polymer, to obtain directly from the reaction a modified (grafted) particulate polyolefin. Thus, no melting of the polymer is effected. The reaction is carried out in a reaction zone of the fluidized bed type or in a heated jacketed vessel provided with mixing means.

DE 2,440,668 teaches a filled polyolefin composition produced from a mixture of a molten polyolefin, an organic peroxide, a polar vinyl monomer and a porous filler, preferably a wood flour, the latter being preferably used in an amount of 20% to 60% by weight of the polyolefin. The polyolefin has an isotactic index of at least 80% and is preferably an isotactic polypropylene. The polypropylene can be mixed with up to 15% by weight of another α-olefin. Mentioned among preferred vinyl monomers is i.a. glycidyl methacrylate, which has a good affinity for wood flour. The powdery mixture is processed in a kneader extruder (LD= 22) at 150°–185°-180° C. (feeding zone—metering zone—die) and is then granulated. The process is aiming at obtaining a filled PP composition that can be processed by injection moulding or extrusion to give articles having good mechanical properties.

EP 0274744 teaches modified, elastomeric ethylenepropylene copolymers (EPDM) for addition to common thermoplastic resins, such as polycarbonates, polyesters, polyphenyene ethers, polyimides, polyamides, etc., to achieve improved impact resistance, especially in the knitlines of articles manufactured by injection moulding. The compositions are obtained by a graft polymerization reaction, wherein the EPM or EPDM composition is grafted in an extruder with an unsaturated hydrocarbon compound having an epoxy functionality, in the presence of a peroxide catalyst. The preferred unsaturated hydrocarbon compounds having an epoxy functionality, are glycidyl compounds, particularly glycidyl methacrylate. During the production of the EPM or EPDM composition, a mixture of the unsaturated hydrocarbon compound having epoxy functionality, and the peroxide catalyst, is added in the extruder at a position shortly downstream of the hopper. It is essential that the EPM/EPDM composition should have a degree of crosslinking corresponding to a gel content of at least 5%. When the modified polymer composition is dispersed as discrete particles in thermoplastic compositions, the impact resistance of such compositions is improved.

SUMMARY OF THE INVENTION

When grafting an epoxy alkyl acrylate compound onto a polypropylene composition, it has now been found possible, through a specific selection of grafting conditions, to produce a grafted polypropylene composition while maintaining full control of the process conditions, thus enabling an easy predetermination of all the properties of the product. It has thus been made possible to produce with good reproducibility grafted polypropylene compositions having a broad spectrum of desired properties, such as melt flow index and degree of grafting, which properties make them useful as additives for various purposes.

Thus, the present invention provides a polypropylene composition grafted with an epoxy-alkyl acrylate compound using an organic peroxide as a radical-generating compound, which grafted polypropylene composition is characterized by having a melt flow index MFI in the range of 1 to 250 g/10 min, especially in the range of 3 to 40 g/10 min, and a degree of grafting of 0.2% to 10% by weight, especially 0.8% to 2.5% by weight, and by being capable of being prepared by:

(i) mixing the polypropylene composition with the organic peroxide and melting the mixture under an inert atmosphere, preferably with kneading of the mixture, (ii) introducing into the melted mixture an epoxy-alkyl acrylate compound of the general formula:

wherein R is H or $C_{1-4}$ alkyl, and n is an integer of 1 to 6.

(iii) kneading the mixture until the epoxy-alkyl acrylate compound has reacted with the polypropylene composition to a desired degree of grafting, and

(iv) cooling and granulating the kneaded product.

Said grafted polypropylene composition is preferably produced by using an extruder.

The present invention also provides a process for producing a polypropylene composition grafted with an epoxy-alkyl acrylate compound, wherein the grafting is carried out under kneading in the presence of an organic peroxide. The process is characterized by the steps of:

(i) mixing the polyproylene composition with the organic peroxide and melting the mixture under an inert atmosphere, preferably with kneading of the mixture, (ii) introducing into the melted mixture an epoxy-alkyl acrylate compound of the general formula:

wherein R is H or $C_{1-4}$ alkyl, and n is an integer of 1 to 6, (iii) kneading the mixture until the epoxy-alkyl acrylate compound has reacted with the polypropylene composition to a desired degree of grafting, and (iv) cooling the granulating the kneaded product.

The grafting process of the invention is preferably carried out in an extruder, by carrying out the following steps: (i) reacting the polypropylene composition during melting and/ or in a melted condition, with the peroxide in an inert atmosphere in an extruder, with (a) the polypropylene composition and the peroxide being introduced into the hopper of the extruder either together, optionally as a premixture, or as separate compounds, or (b) the polypropylene composition being introduced into the extruder at a point downstream of the hopper, (ii) introducing the epoxy-alkyl acrylate compound into the extruder through an aperture in the wall of the extruder barrel at a position of the extruder where the polypropylene composition with added peroxide is in a melted condition, (iii) processing the mixture in the extruder until the epoxy-alkyl acrylate compound has reacted with the polypropylene composition to a desired degree of grafting, and (iv) cooling the granulating the extruded product.

DETAILED DESCRIPTION OF THE INVENTION

The polypropylene composition useful in the invention are polypropylene homopolymers, and copolymers of propylene with ethylene and/or butadiene, especially compositions which have a molecular weight of 150.000 to 500.000 and a melt flow index MFI of 0.2 to 50.

Organic peroxides that are particularly useful as radical-generating compounds in the grafting process are those which have a decomposition temperature lower than the processing temperature of the polypropylene composition to be grated. Among such peroxides the following may be mentioned: t-butyl peroxybenzoate (such as "Triganox C" from Akzo), azo-bis-butyronitrile (such as "Perkadox 14" from Akzo), bis-tert-butyl peroxy-isopropyl benzene (such as "Perkadox BC" from Akzo), and dicumyl peroxide, particularly t-butylperoxybenzoate. The peroxide is utilized in an amount of 0.01% to 1.0% by weight (100 to 10,000 ppm), based on the amount of the polypropylene composition.

The epoxy-alkyl acrylate compounds of the above formula I are preferably glycidyl acrylate coompounds, i.a. compounds wherein n in formula I is 1. The acrylate compounds of formula I are used in an amount of 0.5% to 10% by weight, based on the amount of the polypropylene composition.

The grafting process is started by the polypropylene composition being reacted, during melting and/or in a melted condition, with the peroxide. As mentioned above, the polypropylene composition and the peroxide are introduced into the hopper of the extruder either together, if desired as a pre-mixture, or separately, or the polypropylene composition is introduced into the hopper of the extruder, whereas the peroxide is introduced into the extruder, whereas the peroxide is introduced into the extruder downstream of the hopper. The peroxide may be in liquid form or in powder form and may be added as such, or it may be added as a solution in a solvent, e.g. in n-pentane. During the heating, the peroxide (R—O—O—R') is decomposed with generation of free radicals:

The radicals will react with the polyolefin chains to form polyolefin radicals. Then the vinyl monomer (the epoxy-alkyl acrylate compound), which can be represented by the general formula $CH_2=CH—X$, is added. Said vinyl monomer adds to the polyolefin chain:

All vinyl monomers will have a tendency to homopolymerize, but this tendency will depend on the nature of the group X. While many vinyl compounds exhibit a relatively low degree of homopolymerization, a compound such as glycidyl methacrylate may cause problems in this respect. When the polyolefin composition is polypropylene (PP) and the epoxy-alkyl acrylate compound is glycidyl methacrylate, the grafting reaction may be represented by the reaction equation wherein m designates the number of glycidyl methacrylate monomeric units that have reacted with each other to form a graft side chain. In other words, m indicates the length of the side chain. The aim is to control the grafting process in such a manner that the highest possible number of grafting sites on the polymer chains is achieved, together with a relatively low degree of homopolymerization, which means that m in the end product must have a relatively low value. A factor promoting the homopolymeriztion of the glycidyl methacrylate is the fact that the organic peroxide and glycidyl methacrylate have a mutual solubility which addition is higher than the solubility of each of them in the polypropylene. However, it is possible to avoid homopolymerization of glycidyl methacrylate by selecting appropriate process parameters. Thus, in the process of the present invention the polypropylene composition with the peroxide well dispersed therein and in the absence of glycidyl methacrylate, is heated and processed in such a manner that a maximum amount of tertiary polypropylene radicals is generated. Then the glycidyl methacrylate is added to the molten polymer composition, which addition is made in a manner such as to achieve a maximum mixing effect.

The grafting process may be carried out in any suitable apparatus in which a thorough kneading of the polypropylene composition containing the added components may be achieved. A particularly suitable apparatus is an extruder.

One of the problems connected with the carrying out of the grafting process is contamination with oxygen from the surrounding air. Oxygen will react spontaneously with the generated radicals with generation of oxy-radicals, which are particularly active agents for the cutting of polymer chains. Therefore, the extrusion must be carried out under an inert atmosphere, e.g. with nitrogen as an inert gas. Also, a stabilizer such as "Irganox 1010" from Ciba Geigy may be added to the polypropylene composition. This stabilizer contains a hindered phenol which has a favourable effect on the stabilization of the radicals and inhibits rupture of the polymer chains at the β-position. For direct process stabilization a phosphite-containing stabilizer may be used, which also inhibits chain rupture. For the same reason, the extrusion temperature should be kept as low as practically possible.

The extrusion should preferably be performed in a twin screw extruder having one or more compression zones. The glycidyl methacrylate is introduced into a zone positioned downstream of a first compression zone, where the polypropylene composition is present in a molten state. A suitable temperature profile in the extruder during a polypropylene grafting process may be:

| Zone | 1 | 2 | 3 | 4–8 | 9 | 11 | 12 |
|---|---|---|---|---|---|---|---|
| Temp., °C. | 90 | 210 | 230 | 180 | 210 | 220 | 220 |

Figure 1:
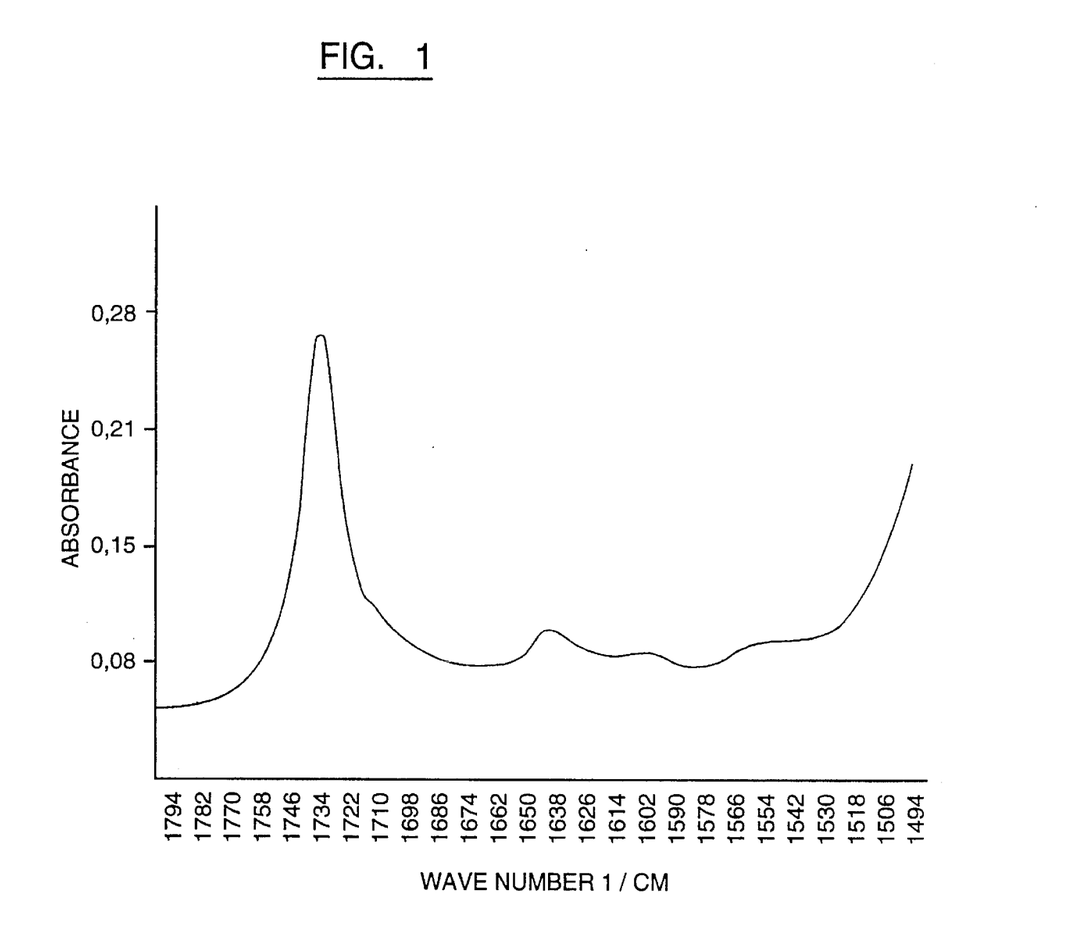
FIG. 1 shows an IR absorption spectrum typical of glycidyl methacrylate (GMA)

The aim is to maintain a relatively low melt temperature of 180° C. i the reaction zone in order to minimize the number of chain scissions. It will be appropriate, however, to use a higher temperature in the metering zone and in the die zone. It is essential to provide an effective venting to remove unreacted monomers. Should the grafted polypropylene composition contain more than 500 ppm of residual monomer, such monomer may if desired be removed in a separate stripping step in a manner known per se. The grafted composition is then extruded in the usual manner in the form of strands which are then cooled and granulated The amount of epoxy-alkyl acrylate compound that has been grafted on the polyolefin chains can be determined by using infrared spectroscopy (IR). Appended FIG. 1 shows an IR absorption spectrum typical of glycidyl methacrylate (GMA).

Due to its chemical structure glycidyl methacrylate has two particularly characteristic absorption peaks, i.e. one for the carboxyl group and one for the vinyl group.

Carbonyl/carbonyl group: $-\overset{\|}{C}-$ at: 1728 cm$^{-1}$
C=C double bond; vinyl group: $-C=C-$ at: 1640 cm$^{-1}$ In a reaction been the vinyl group of the glycidyl methacrylate and the polypropylene composition it is the —C═C—double bond that reacts. Due to this reaction the intensity of the signal (the area under the peak) at 1640 cm$^{-1}$ will decrease proportionally with the amount of glycidyl methacrylate that has reacted. The intensity of the signal (the area under the peak) at 1728 cm$^{-1}$ for the carbonyl group will not charge, i.e. neither the wave length nor the molar extinction coefficient changes, even though the glycidyl methacrylate has reacted. Therefore, the area under the peak at 1728 cm$^{-1}$ will always be a measure of the concentration of added glycidyl methacrylate, whereas the decrease in the area under the peak at 1640 cm$^{-1}$ compared with the area under the peak at 1728 cm$^{-1}$ will be a measure of the proportion of the added glycidyl methacrylate that has reacted. Thus, the grafting efficiency (E), which is a measure of the proportion of the added glycidyl methacrylate that grafted on the polypropylene, can be calculated as follows:

The ratio between the areas under the peaks for the —C═C— double bond and carbonyl in pure GMA is:

$$Y_{pure} = \frac{[\text{Area at 1640 cm}^{-1}]}{[\text{Area at 1728 cm}^{-1}]}$$

In the polypropylene composition wherein GMA has reacted said ratio is:

$$Y_1 = \frac{[\text{Area at 1640 cm}^{-1}]}{[\text{Area at 1728 cm}^{-1}]}$$

Thus, one has:
$Y_1/Y_{pure}$=the fraction of free GMA in the grafted composition.
The grafting efficiency is then:

$$E = [1 - Y_1/Y_{pure}] \cdot 100\%$$

By means of calculations and curve adjustments it has been found that $Y_{pure}$=0.106 for glycidyl methacrylate admixed with polypropylene.

Figure 2A:
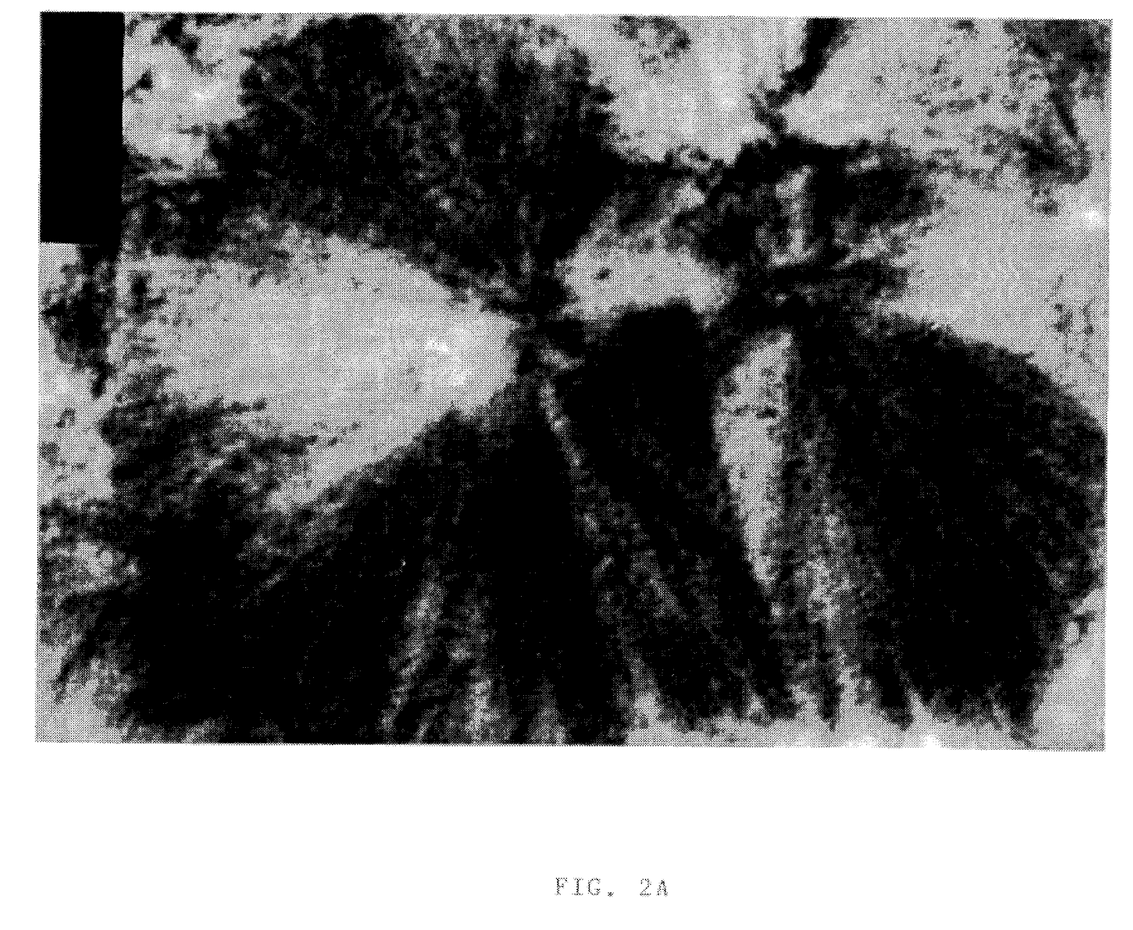
FIGS. 2A, 2B and 2C are interference microscopy (magnification 1250x) pictures showing a pure polypropylene composition of the grade "Statoil P330" having typical spherulities (FIG. 2.1), a partly grafted polypropylene composition produced from "Statoil P330" and glycidyl methacrylate (FIG. 2.2), and the same polypropylene grade grafted with glycidyl methacrylate in accordance with the invention showing a homogenous structure (FIG. 2.3)
Figure 2B:
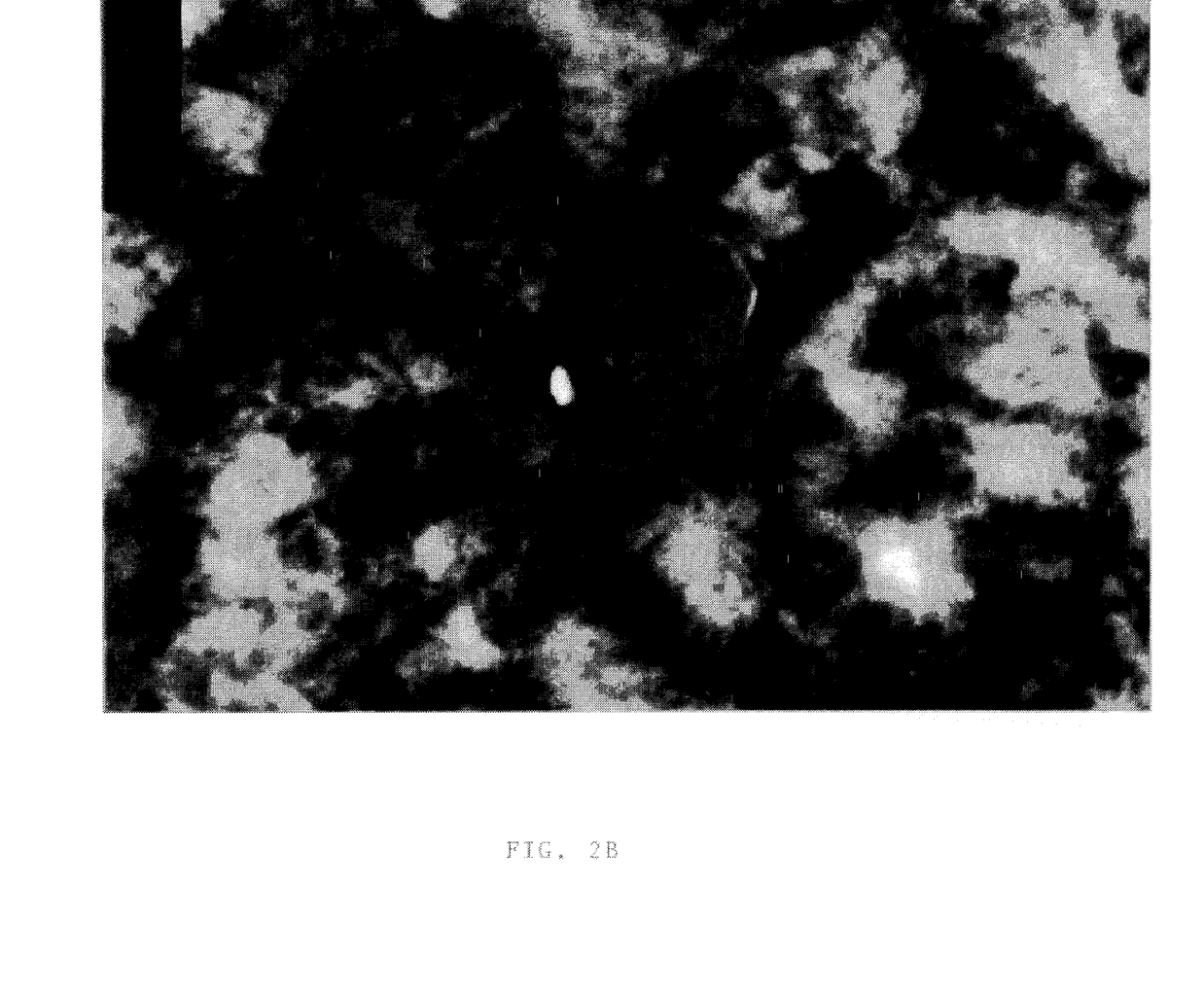
Figure 2C:
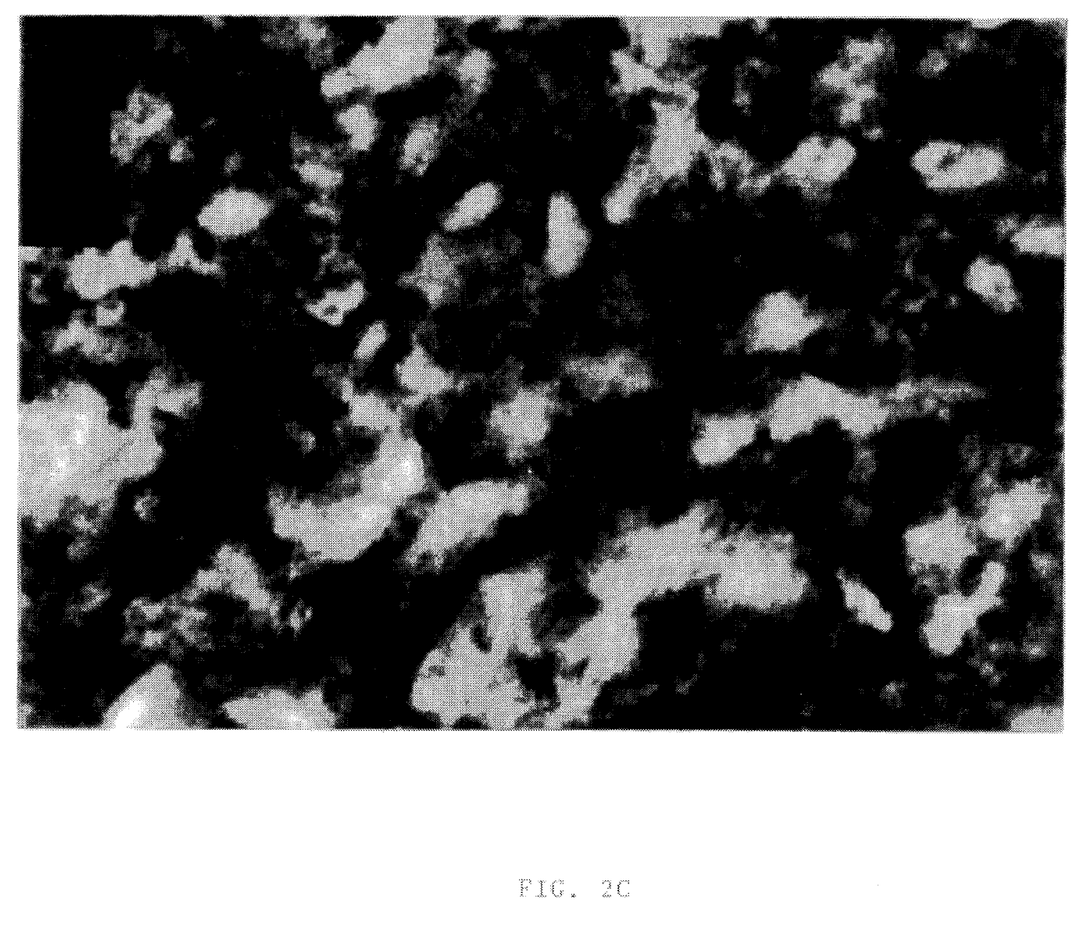

As already mentioned, glycidyl methacrylate may homopolymerize instead of grafting to the polymer composition. This fact may be demonstrated by the use of interference microscopy, revealing a possible dispersed phase of homopolymerized glycidyl methacrylate in the polypropylene matrix. FIGS. 2A, 2B and 2C are pictures taken by means of interference microscopy at a magnification of 1250x. FIG. 2A shows a pure polypropylene composition of the grade "Statoil P330" having typical spherulites. FIG. 2B shows a picture of a partly grafted polypropylene composition produced from "Statoil P330" and glycidyl methacrylate added in the feeding zone of the extruder (position 1 in FIG. 3). The glycidyl methacrylate has been partly grafted on the polypropylene and is present partly as a homopolymerized glycidyl methacrylate in a separate phase which is clearly seen on the picture. FIG. 2C shows a picture of the same polypropylene grade grated with glycidyl methacrylate in accordance with the invention. In this case, the glycidyl methacrylate has been introduced into the extruder through an aperture in the wall of the extruder barrel at a position of the extruder (position 3 in FIG. 3) where the polypropylene composition is present in a molten state. The picture shows that the grafted composition has a homogenous structure, which indicates that the glycidyl methacrylate has been grafted to the polypropylene and therefore is not present as a homopolymerized, dispersed phase. The spherulite sizes are also reduced, which suggests a nucleation effect.

When the grafting reaction itself is finished, any free, unreacted glycidyl methacrylate can be removed by heating the polypropylene composition under a vacuum. By taking IR absorption spectra of the composition before and after the heating, a measure of the amount of glycidyl methacrylate that has been removed and consequently has not reacted, can be obtained.

In order to further confirm that grafting had occurred, IR absorption spectra of the grafted polypropylene composition were taken before and after removal of unreacted glycidyl methacrylate. A film of a thickness of 0.3 mm was compression moulded from the grafted polypropylene composition and an IR absorption spectrum was obtained. Then the film was subjected to a thermal treatment at 120° C. for a period of 18 hours, whereupon a new IR absorption spectrum was taken. Any change of area under the peak at 1728 cm$^{-1}$ in the absorption spectrum is directly correlated to the amount of free glycidyl methacrylate that has been removed. The grafting efficiency is given by the relation:

Grafting efficiency $E =$ $$\frac{[\text{Area at 1728 cm}^{-1}] \text{ after removal}}{[\text{Area at 1728 cm}^{-1}] \text{ before removal}} \cdot 100\%$$

Performed tests showed that the grafting efficiency calculated by this method correlated very well with the results obtained by the use of the direct IR method described above. Also, a clear indication that grafting has taken place can be seen in the fact that the absorption peak at 1640 cm$^{-1}$ (the double bond in the vinyl group) decreases and approaches zero as a consequence of the thermal treatment, which means that only marginal amounts of free glycidyl methacrylate are present after such treatment.

The glycidyl methacrylate grafted onto the polyolefin chains will provide the polypropylene composition with polar groups. Therefore, the modified polypropylene composition will be suitable as an additive having the property of essentially increasing the blendability of various compositions. As an additive in polymer blends it will reduce the interphase tensions and enable the production of true polymer alloys. Furthermore, it will be capable of stabilizing the morphology of polymer blends and alloys. Consequently, it may also be used as a compatibilizer in recycled plastic products. Such modified polypropylene compositions can also be used as additives in polymer compositions intended to be painted, for the purpose of improving the adherence between the polymer composition and the paint components. The modified material also has a nucleating effect (nucleating agent).

The invention is illustrated in further detail by the following examples.

EXAMPLES

In the example below, grafting of glycidyl methacrylate on polypropylene was performed, using the following materials and conditions:

Polypropylene compositions: The polypropylene compositions used were of the grades "Statoil P330" (MFI=5.5) and "Statoil P401" (MFI=0.35), containing standard polypropylene stabilizer(s). The polypropylene composition premixed with stabilizer(s) was introduced into the extruder through the feed hopper.

Peroxide: t-Butylperoxybenzoate ("Trigonox C" from Akzo) was used in amounts up to 5000 ppm based on the weight of the polypropylene. The peroxide was dissolved in n-pentane and mixed with the polypropylene composition (premix) in an amount of 150 ml of n-pentane solution per 2 kg of compound. Prior to the grafting reaction the pentane was vaporized from the premix.

Glycidyl acrylate compound: There was used 0.2% to 5% by weight of glycidyl methacrylate (GMA) (Fluka) to which 0.05% of hydroquinone had been added as a stabilizer. The GMA was added to the polypropylene composition at any of positions 1 to 6 of the extruder. When the addition was made at position 1 (the feed hopper) the GMA was preblended with the polypropylene composition to form a premix (Comparison Example 1). When the addition was made at the other positions the GMA was metered with a pump in an amount of 1.0 to 2.0 ml/min, corresponding to 2.25% to 5.00% by weight.

Figure 3:
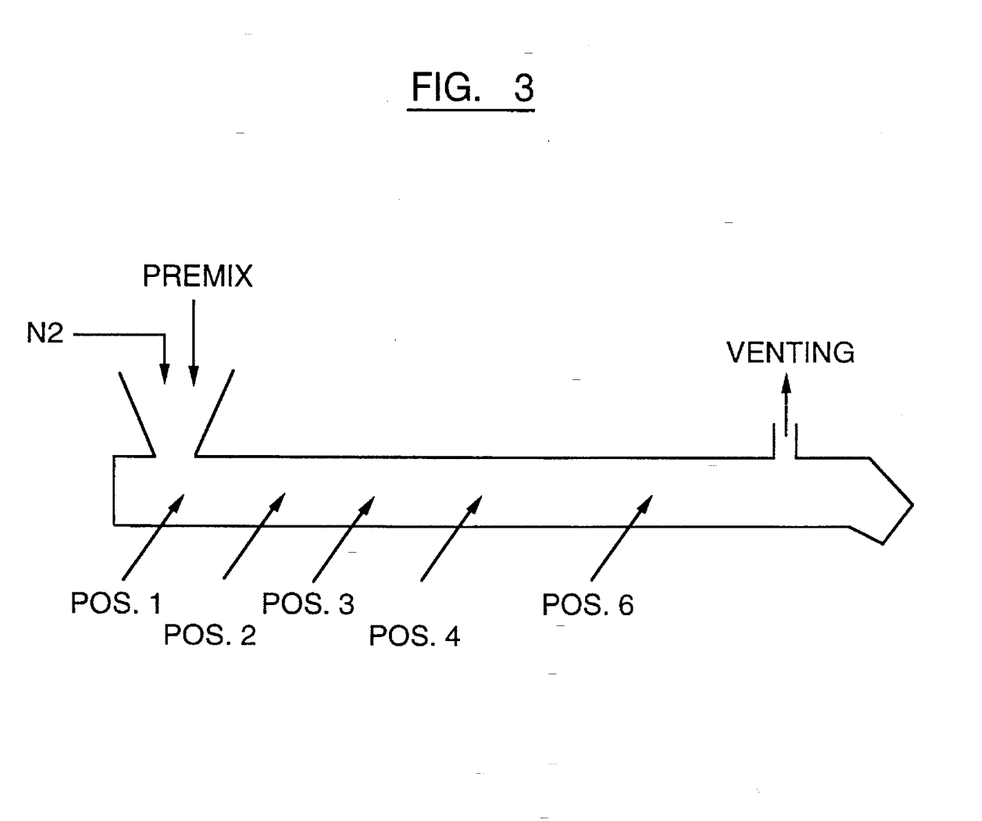
FIG. 3 shows a schematic view of an extruder in which the grafting process may be carried out.

Extrusion conditions: The principle of the extruder arrangement is shown in FIG. 3. Here, position 1 designates the beginning of the feeding zone (the feed hopper) and position 6 the beginning of the metering zone. The other positions are evenly partitioned between said two positions, so that position 3 will be positioned slightly upstream of the middle of the extruder barrel. In all the tests, the feed hopper was continuously flushed with nitrogen, so that the processing of the polypropylene composition was perfomred in an inertly atmosphere. The screw speed was 200 rpm and the extrusion speed was 3 kg/h. Under these conditions the total dwelling time of the polymer composition in the extruder was 1.5 to 2 minutes.

Example 1 to 5

A polypropylene of the grade "Statoil P330" having a MFI of 5.5 was used. The GMA was added at positions 2, 3 and 4 of the extruder. The obtained results are presented in Table 1.

Example 6

A polypropylene of the grade "Statoil P401" having a MFI of 0.35 was used. The GMA was added at position 4 of the extruder. The obtained results are presented in Table 1.

Examples 7 and 8 (Comparison examples)

The same grade of polypropylene was used as in Examples 1 to 5. The GMA was introduced into the feeding zone of the extruder (Position 1) together with polypropylene and peroxide. The obtained results are given in Table 1.

Examples 9 and 10 (Comparison examples)

The procedure was the same as in Example 1, but the GMA was added at position 6 of the extruder. The obtained results are presented in Table 1.

The results presented in Table 1 show that the achieved degree of grafting depends on where in the extruder the GMA is added to the polypropylene melt. The degree of grafting, which is a measure of the amount of GMA grafted onto the polypropylene chains, given in % by weight of the total amount of polypropylene composition, is calculated on the basis of the grafting efficiency, which is the proportion of the added GMA that has been grafted onto the polypropylene chains. The highest degree of grafting was achieved by adding the GMA at position 3 (Examples 2 to 4). Lower degrees of grafting were achieved by adding GMA at positions 2 and 4, and the lowest degrees of grafting were achieved using positions 1 and 6. Example 3 shows, in comparison with Example 2, that an increase of the screw speed does not influence the degree of grafting, but an increased screw speed will probable increase the amount of friction heat generated in the composition and consequently also the degradation thereof, which explains the higher melt flow index. In Example 4, a reduced amount of GMA was added, which resulted in a reduced degree of grafting. Example 6 shows that even with a very viscous polypropylene composition (MFI=0.35) an acceptable degree of grafting was achieved. Comparison examples 7 to 10 show that the addition of the GMA at position 1 (the feed hopper) or at position 6 (the metering zone) resulted in low, difficultly controllable degrees of grafting having relatively large variations.

TABLE 1

| Example | Peroxide (% by weight) | GMA (% by weight) | GMA added at Pos. | MFI start | MFI end | Grafting efficiency (%) | Degree of grafting (%) |
|---|---|---|---|---|---|---|---|
| 1 | 0,5 | 4,5 | 2 | 5,5 | 28 | 21 | 0,95 |
| 2 | 0,5 | 5,0 | 3 | 5,5 | 30 | 40 | 2,0 |
| 3[1] | 0,5 | 5,0 | 3 | 5,5 | 43 | 40 | 2,0 |
| 4 | 0,25 | 2,25 | 3 | 5,5 | 30 | 27 | 1,35 |
| 5 | 0,5 | 4,5 | 4 | 5,5 | 59 | 24 | 1,1 |
| 6 | 0,5 | 4,5 | 3 | 0,35 | 3 | 25 | 1,13 |
| 7 (Comp.) | 0,25 | 2,25 | 1 | 5,5 | 24 | 13 | 0,30 |
| 8 (Comp.) | 0,25 | 2,25 | 1 | 5,5 | 26 | 18 | 0,41 |
| 9 (Comp. | 0,25 | 5,0 | 6 | 5,5 | 54 | 15 | 0,75 |
| 10 (Comp.) | 0,5 | 2,25 | 6 | 5,5 | 85 | 16 | 0,36 |

[1]Screw speed 400 rpm (vs. 200 rpm in the other examples).

We claim:

1. A process for producing a polypropylene composition grafted with an epoxy-alkyl acrylate compound, which grafted polypropylene composition has a melt flow index MFI in the range of 1 to 250 g/10 min and a degree of grafting of 0.2% to 10% by weight, wherein the grafting is carried out under kneading in the presence of an organic peroxide, comprising the steps of:

(i) mixing the polypropylene composition with the organic peroxide and melting the mixture under an inert atmosphere, (ii) introducing into the melted mixture an epoxy-alkyl acrylate compound of the general formula:

wherein R is selected from the group consisting of H and $C_{1-4}$ alkyl, and n is an integer of 1 to 6, (iii) kneading the mixture until the epoxy-alkyl acrylate compound has reacted with the polypropylene composition to a desired degree of grafting, and (iv) cooling and granulating the kneaded product.

2. The process according to claim 1, wherein the grafting is carried out in an extruder, comprising the steps of:

(i) reacting the polypropylene composition in a melted condition with the peroxide in an inert atmosphere in an extruder, with the polypropylene composition and the peroxide being introduced into the hopper of the extruder, (ii) introducing the epoxy-alkyl acrylate compound into the extruder through an aperture in the wall of the extruder barrel at a position of the extruder where the polypropylene composition with added peroxide is in a melted conditions, (iii) processing the mixture in the extruder until the epoxy-alkyl acrylate compound has reacted with the polypropylene composition to a desired degree of grafting, and (iv) cooling and granulating the extruded product.

3. The process according to claim 2, wherein the epoxy-alkyl acrylate compound is added downstream of a first compression zone in the extruder.

4. The process according to claim 3 wherein said polypropylene composition is selected from the group consisting of a propylene homopolymer, a copolymer of propylene with ethylene, a copolyer of propylene with butadiene and a copolymer of propylene with ethylene and butadiene.

5. The process according to claim 4 wherein said epoxy-alkyl acrylate compound is selected from the group consisting of glycidyl acrylate and glycidyl methacrylate.

6. The process according to claim 5 wherein said inert gas in nitrogen gas.

7. The process according to claim 2 wherein, in step (i), the polypropylene composition is melted during the reacting step.

8. The process according to claim 2 wherein, in step (i), the polypropylene composition and the peroxide are introduced into the hopper of the extruder together, as a premixture.

9. The process according to claim 2 wherein, in step (i), the polypropylene composition and the peroxide are introduced into the hopper of the extruder separately.

10. The process according to claim 2 wherein the extrusion processing is carried out at a temperature near the melting temperature of the polypropylene composition.

11. The process according to claim 2 wherein said polypropylene composition is selected from the group consisting of a propylene homopolymer, a copolymer of propylene with ethylene, a copolymer of propylene with butadiene and a copolymer of propylene with ethylene and butadiene.

12. The process according to claim 2 wherein said epoxy-alkyl acrylate compound is selected from the group consisting of glycidyl acrylate and glycidyl methacrylate.

13. The process according to claim 2 wherein said inert gas is nitrogen gas.

14. The process according to claim 1 wherein the kneading processing is carried out at a temperature near the melting temperature of the polypropylene composition.

15. The process according to claim 14 wherein said polypropylene composition is selected from the group consisting of a propylene homopolymer, a copolymer of propylene with ethylene a copolymer of propylene with butadiene and a copolyer of propylene with ethylene and butadiene.

16. The process according to claim 15 wherein said epoxy-alkyl acrylate compound is selected from the group consisting of glycidyl acrylate and glycidyl methacrylate.

17. The process according to claim 16 wherein said inert gas is nitrogen gas.

18. The process according to claim 1 wherein said polypropylene composition is selected from the group consisting of a propylene homopolymer, a copolymer of propylene with ethylene, a copolymer of propylene with butadiene and a copolymer of propylene with ethylene and butadiene.

19. The process according to claim 18 wherein said epoxy-alkyl acrylate compound is selected from the group consisting of glycidyl acrylate and glycidyl methacrylate.

20. The process according to claim 19 wherein said inert gas is nitrogen gas.

21. The process according to claim 1 wherein said epoxy-alkyl acrylate compound is selected from the group consisting of glycidyl acrylate and glycidyl methacrylate.

22. The process according to claim 21 wherein said inert gas is nitrogen gas.

23. The process according to claim 1 wherein said inert gas is nitrogen gas.

24. The process according to claim 1, wherein the grafting is carried out in an extruder, comprising the steps of:
   (i) reacting the polypropylene composition in a melted condition with the peroxide in an inert atmosphere in an extruder, with the polypropylene composition being introduced into the hopper of the extruder and the peroxide being introduced into the extruder at a point downstream of the hopper,
   (ii) introducing the epoxy-alkyl acrylate compound into the extruder through an aperture in the wall of the extruder barrel at a position of the extruder where the polypropylene composition with added peroxide is in a melted condition,
   (iii) processing the mixture in the extruder until the epoxy-alkyl acrylate compound has reacted with the polypropylene composition to a desired degree of grafting, and
   (iv) cooling and granulating the extruded product.

25. The process according to claim 24 wherein, in step (I), the polypropylene composition is melted during the reacting step.

26. The process according to claim 24, characterized in that the epoxy-alkyl acrylate composition is added downstream of a first compression zone in the extruder.

27. The process according to claim 24 wherein the extrusion processing is carried out at a temperature near the melting temperature of the polypropylene composition.

28. The process according to claim 24 wherein said polypropylene composition is selected from the group consisting of a propylene homopolymer, a copolymer of propylene with ethylene, a copolyer of propylene with butadiene and a copolymer of propylene with ethylene and butadiene.

29. The process according to claim 24 wherein said epoxy-alkyl acrylate compound is selected from the group consisting of glycidyl acrylate and glycidyl methacrylate.

30. The process according to claim 24 wherein said inert gas is nitrogen gas.

31. The process according to claim 1 further comprising, in step (i), kneading the mixture during melting.

* * * * *